US011398322B2

(12) United States Patent
Goertzen et al.

(10) Patent No.: US 11,398,322 B2
(45) Date of Patent: Jul. 26, 2022

(54) ALTERNATE DEPLOYED ELECTRIC SUBMERSIBLE PUMPING SYSTEM CABLE

(71) Applicant: SCHLUMBERGER TECHNOLOGY CORPORATION, Sugar Land, TX (US)

(72) Inventors: William Goertzen, Lawrence, KS (US); Mark Metzger, Lawrence, KS (US); Jason Holzmueller, Lawrence, KY (US); Gregory Howard Manke, Overland Park, KY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/621,198

(22) PCT Filed: Jun. 7, 2018

(86) PCT No.: PCT/US2018/036365
§ 371 (c)(1),
(2) Date: Dec. 10, 2019

(87) PCT Pub. No.: WO2018/231608
PCT Pub. Date: Dec. 20, 2018

(65) Prior Publication Data
US 2020/0243218 A1 Jul. 30, 2020

Related U.S. Application Data

(60) Provisional application No. 62/517,974, filed on Jun. 11, 2017.

(51) Int. Cl.
*H01B 9/00* (2006.01)
*H01B 7/04* (2006.01)
(Continued)

(52) U.S. Cl.
CPC ............. *H01B 7/046* (2013.01); *F04B 17/03* (2013.01); *H01B 7/223* (2013.01); *H02G 9/10* (2013.01); *H02K 5/132* (2013.01)

(58) Field of Classification Search
CPC .................................. H01B 5/08; H01B 9/00
See application file for complete search history.

(56) References Cited

U.S. PATENT DOCUMENTS 1,199,789 A * 10/1916 Hochstadter ........... H01B 7/226
174/106 R
1,370,731 A * 3/1921 Chase ..................... H01B 7/26
174/103

(Continued)

FOREIGN PATENT DOCUMENTS

JP 2015230823 A 12/2015
KR 10-2015-0108962 A 10/2015

OTHER PUBLICATIONS

Reda Coil, Coiled tubing-deployed ESP system, (2013) (5 pages).
(Continued)

*Primary Examiner* — Chau N Nguyen

(57) ABSTRACT

An electric submersible pumping system cable is provided with a plurality of conductors. The electric submersible pumping system cable includes at least one central strength member which may be in the form of a central strength member bundle. The plurality of conductors may be in the form of a plurality of individually insulated conductors arranged about the central strength member. The electric submersible pumping system cable also may include a jacket layer disposed over the insulated conductors.

12 Claims, 4 Drawing Sheets

(51) Int. Cl.
*F04B 17/03* (2006.01)
*H01B 7/22* (2006.01)
*H02G 9/10* (2006.01)
*H02K 5/132* (2006.01)

(56) References Cited

U.S. PATENT DOCUMENTS

| | | | | |
|---|---|---|---|---|
| 2,123,746 A * | 7/1938 | Rost | | H01B 7/0208 |
| | | | | 428/373 |
| 3,737,557 A * | 6/1973 | Verne | | H01B 9/027 |
| | | | | 174/23 R |
| 5,216,205 A * | 6/1993 | Fujii | | H01B 7/0009 |
| | | | | 156/50 |
| 8,143,523 B2 * | 3/2012 | Dalrymple | | H01B 3/28 |
| | | | | 174/113 R |
| 9,123,458 B2 * | 9/2015 | Griffin | | H01B 11/12 |
| 9,343,199 B2 * | 5/2016 | Fogg | | E21B 43/0107 |
| 2007/0000682 A1 | 1/2007 | Varkey et al. | | |
| 2011/0240312 A1 | 10/2011 | Varkey et al. | | |
| 2012/0163758 A1 * | 6/2012 | McCullough | | H01B 1/02 |
| | | | | 385/101 |
| 2013/0272906 A1 | 10/2013 | Head | | |
| 2013/0277042 A1 * | 10/2013 | Scarsdale | | E21B 17/206 |
| | | | | 166/77.2 |
| 2014/0008098 A1 * | 1/2014 | Scaglione | | H01B 7/2825 |
| | | | | 174/107 |
| 2015/0075840 A1 * | 3/2015 | Yamaguchi | | H01B 11/1856 |
| | | | | 174/113 A |
| 2016/0005508 A1 * | 1/2016 | Maclean | | H01B 3/40 |
| | | | | 174/99 R |
| 2019/0254122 A1 * | 8/2019 | Lee | | H05B 3/56 |

OTHER PUBLICATIONS

ZEiTECS Shuttle, Rigless ESP replacement system (2017) 2 pages.
International Search Report and Written Opinion issued in the PCT Application PCT/US2018/036365, dated Sep. 7, 2018 (14 pages).
International Preliminary Report on Patentability issued in the PCT Application PCT/US2018/036365, dated Dec. 26, 2019 (11 pages).
ZEiTECS completes first commercial rigless retrieval of cable deployed ESP in West Texas (2014) 2 pages.

* cited by examiner

ALTERNATE DEPLOYED ELECTRIC SUBMERSIBLE PUMPING SYSTEM CABLE

CROSS-REFERENCE TO RELATED APPLICATION

The present document is based on and claims priority to U.S. Provisional Application Ser. No. 62/517,974, filed Jun. 11, 2017, which is incorporated herein by reference in its entirety.

BACKGROUND

In many hydrocarbon well applications, power cables are employed to deliver electric power to various devices. For example, power cables may be used to deliver electric power to electric submersible pumping systems which may be deployed downhole in wellbores. The power cables are subjected to harsh working environments containing corrosives, e.g. corrosive gases, elevated temperatures, high pressures, and vibrations. Additionally, the power cables may be used in a variety of applications having limited space available.

SUMMARY

In general, the present disclosure provides an electric submersible pumping system cable including at least one central strength member, e.g. a bundle of central strength members. The electric submersible pumping system cable also may comprise a plurality of individually insulated conductors arranged about the at least one central strength member. A jacket layer may be disposed over the insulated conductors.

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
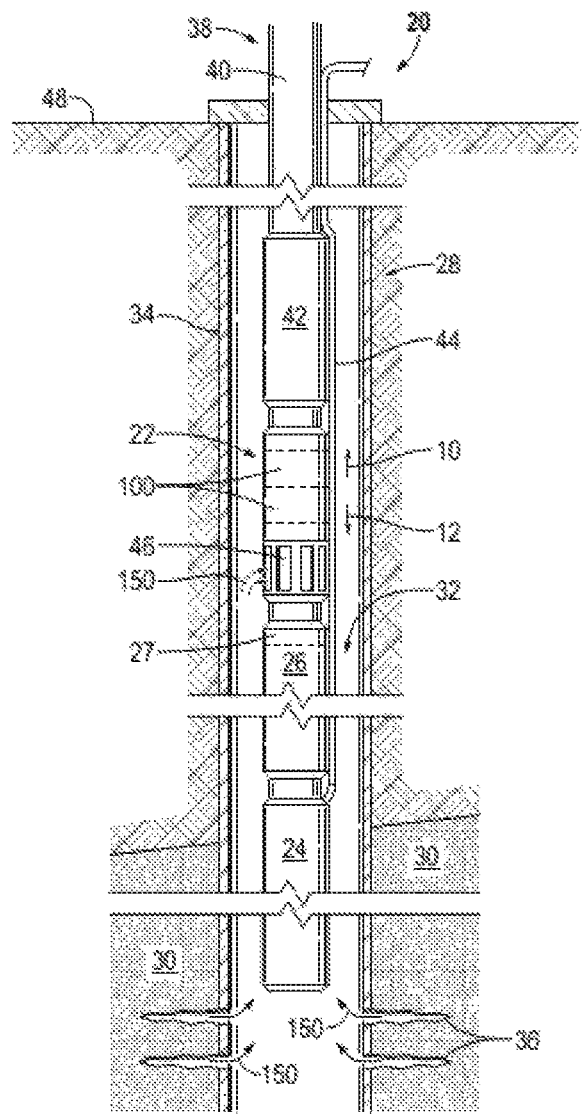
FIG. 1 is an illustration of an example electric submersible pumping (ESP) system installation, according to an embodiment of the disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The disclosure herein generally presents an electrical cable configuration for use with alternate deployed electric submersible pumping systems (e.g., ESP systems deployed downhole via electric cable).

FIG. 1 illustrates an electrical submersible pump system 20 deployed in a well 28. Submersible pumping system 20 may comprise a variety of components depending on the particular application or environment in which it is used. The illustrated pumping system 20 may be an electric submersible pumping (ESP) system including a pump 22 coupled to an electric motor 24 and a motor protector 26. Pump 22 may include two or more stages 100, e.g., compression stages. The pump stages are characterized by the angle of flow passages in the impellers. The stages may be radial flow, mixed flow, or axial flow. The net thrust load, e.g. downthrust load, resulting from rotation of the impellers may be resisted by a bearing 27 illustrated in FIG. 1 in motor protector 26. For the purpose of clarity, arrow 10 indicates the direction of upthrust and an arrow 12 indicates the direction of downthrust.

Well 28 includes a wellbore 32 drilled into a geological formation 30 containing for example a desirable production fluid 150, such as petroleum. Wellbore 32 may be lined with a tubular casing 34. Perforations 36 are formed through wellbore casing 34 to enable flow of fluids between the surrounding formation 30 and the wellbore 32. Submersible pumping system 20 is deployed in wellbore 32 by a deployment system 38 that may have a variety of configurations. For example, deployment system 38 may comprise tubing 40, such as coiled tubing or production tubing, connected to submersible pump 22 by a connector 42. Power may be provided to the submersible motor 24 via a power cable 44. The submersible motor 24, in turn, powers submersible pump 22 which can be used to draw in production fluid 150 through a pump intake 46. Within submersible pump 22, a plurality of impellers are rotated to pump or produce the production fluid 150 through, for example, tubing 40 to a desired collection location which may be at a surface 48 of the Earth.

Embodiments of the disclosure may include an electrical cable using a 120-degree sector conductor design. Embodiments of the electrical cable described herein may be used to deploy electric submersible pumping system 20 downhole. However, the electrical cable also may be used with other conveyances, other pumping system deployment techniques, and other applications for supplying electrical power downhole. Sector conductors are shaped conductors with non-circular cross-sections that are flattened in a radial direction and elongated in a lateral/circumferential direction as compared to a conductor with a circular cross-section. For example, the radial dimension of each conductor cross-section may be 50-80% (or other suitable ratio) of the lateral or circumferential dimension. The reduced radial dimension enables a more space efficient arrangement of conductors so that the cross-sectional area of the ESP cable may be reduced or to provide space for additional or other types of layers. The shaped conductors may be triangular, quadrilateral, polygonal, various arched shapes, e.g. arched along the circumferential direction, or other suitable shapes with a reduced radial dimension. In some embodiments, each conductor is shaped as a sector matching conductor in which the cross-sectional shape of each conductor is selected to facilitate reduction of the radial dimension based on the number of cable sectors, e.g. three sectors, six sectors, or nine sectors.

Figure 2:
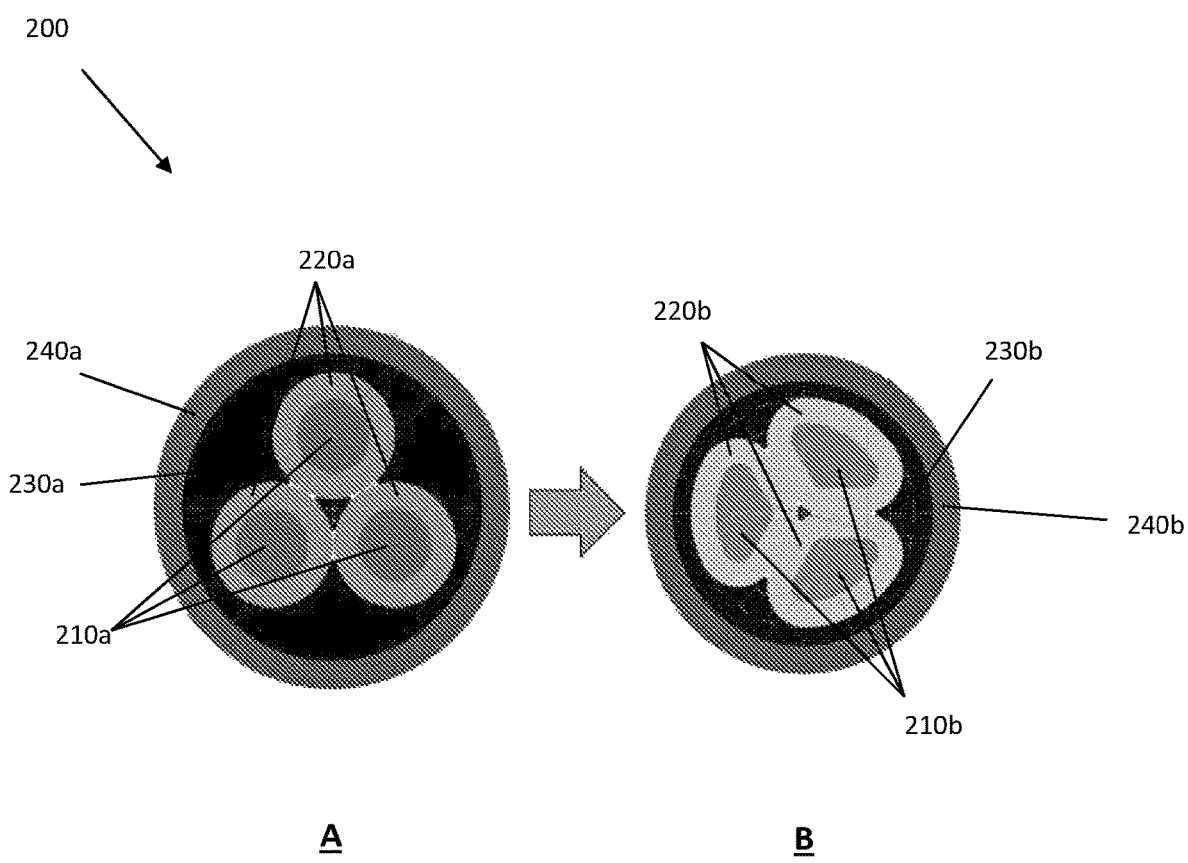
FIG. 2 is an illustration of a comparison of an example ESP cable (A) with an encapsulated ESP cable (B) according to an embodiment of the disclosure.

In the illustrated example, the 120 degree sector conductors may have the same cross-sectional area as a round conductor while reducing the size, e.g. cross-sectional area, of the cable 200 by 10-15% or more. See FIG. 2, cf. A vs. B. As shown in FIG. 2, the use of the 120 degree sector conductors (210*b*, insulation as 220*b*) allows for a reduction in the size of the jacket layer 230*b* vs. 230*a*. The reduction may also have a positive effect on thermal expansion characteristics of the cable (by eliminating extraneous elastomer with high thermal expansion coefficients). In some embodiments, thermally conductive reinforcements may be added to the insulation and jacket materials to further enhance heat dissipation characteristics of the cable.

The tubing encapsulated embodiment, B, of FIG. 2 may also be used with a more conventional wireline-type braided wire on the outside of the jacket (to act as structural member). In some embodiments of the disclosure, the braided wire may be combined with a polymeric jacket and subsequently wrapped with a metal strip armor to provide hoop strength and damage protection. In such instances, fluid resistance may be improved by the use of additional barrier layers around the jacket or conductors. Barrier layers may be polymeric or composite extrusions of fluid resistant materials (PEEK, PVDF, PFA, FEP, etc), or metallic sheaths of corrosion resistant alloys.

In some embodiments of the disclosure, a polyphase alternative deployed ESP cable is provided to further extend the geometrical advantages of an alternative deployed ESP cable with a center strength member (e.g., 460*c*) and a 6- to 12-phase power transmission design. See FIG. 4, C. Any multiple of 3 may be used with existing 3-phase ESP motors (for example, a 6 wire cable has 2 wires for each phase, 9 wire cable has 3 wires for each phase). Furthermore, such power cables would be compatible with 6- to 12-phase ESP motors.

Figure 3:
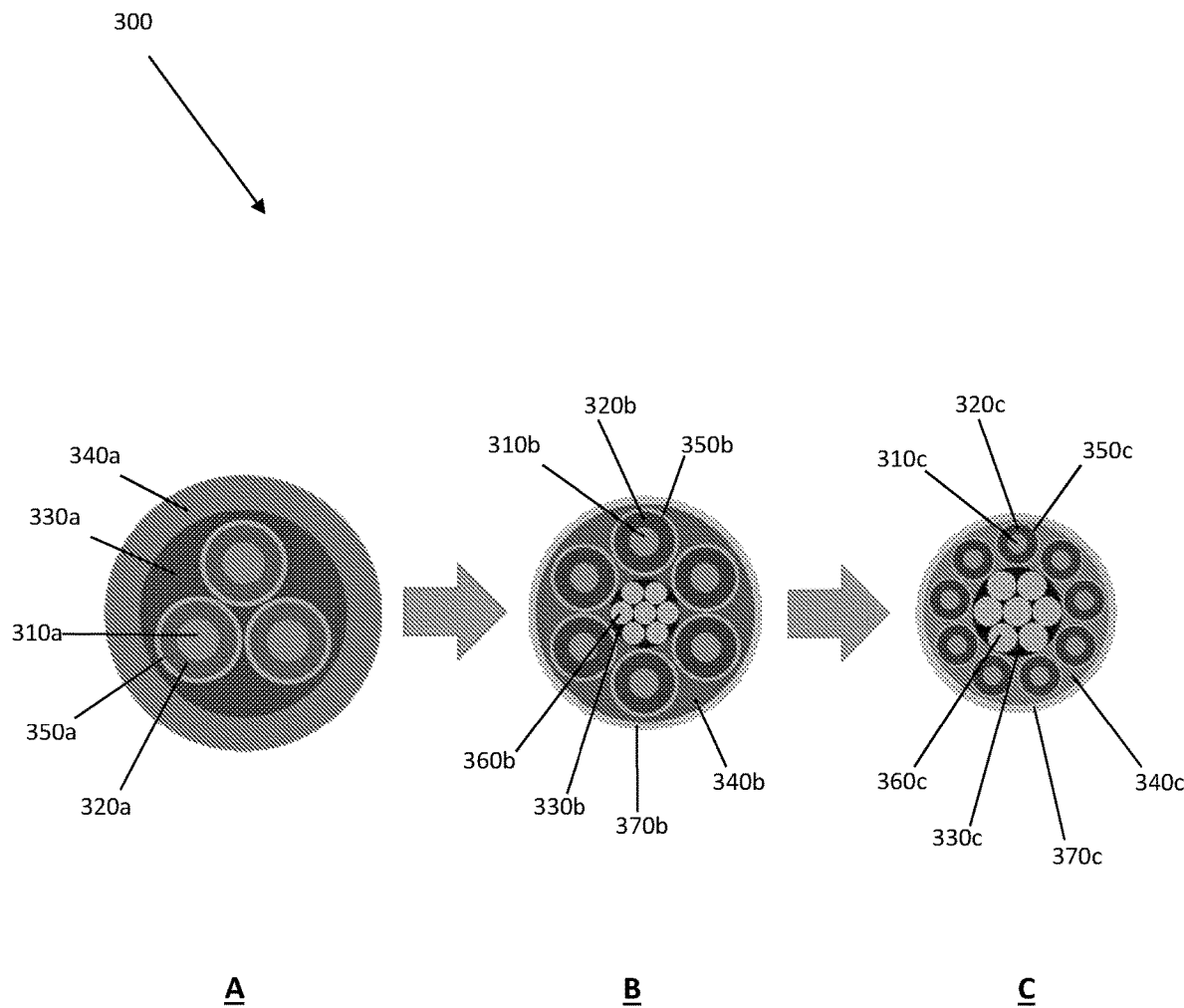
FIG. 3 is an illustration of a comparison of an example ESP cable (A) with polyphase ESP cables (B, C) according to embodiments of the disclosure.
Figure 4:
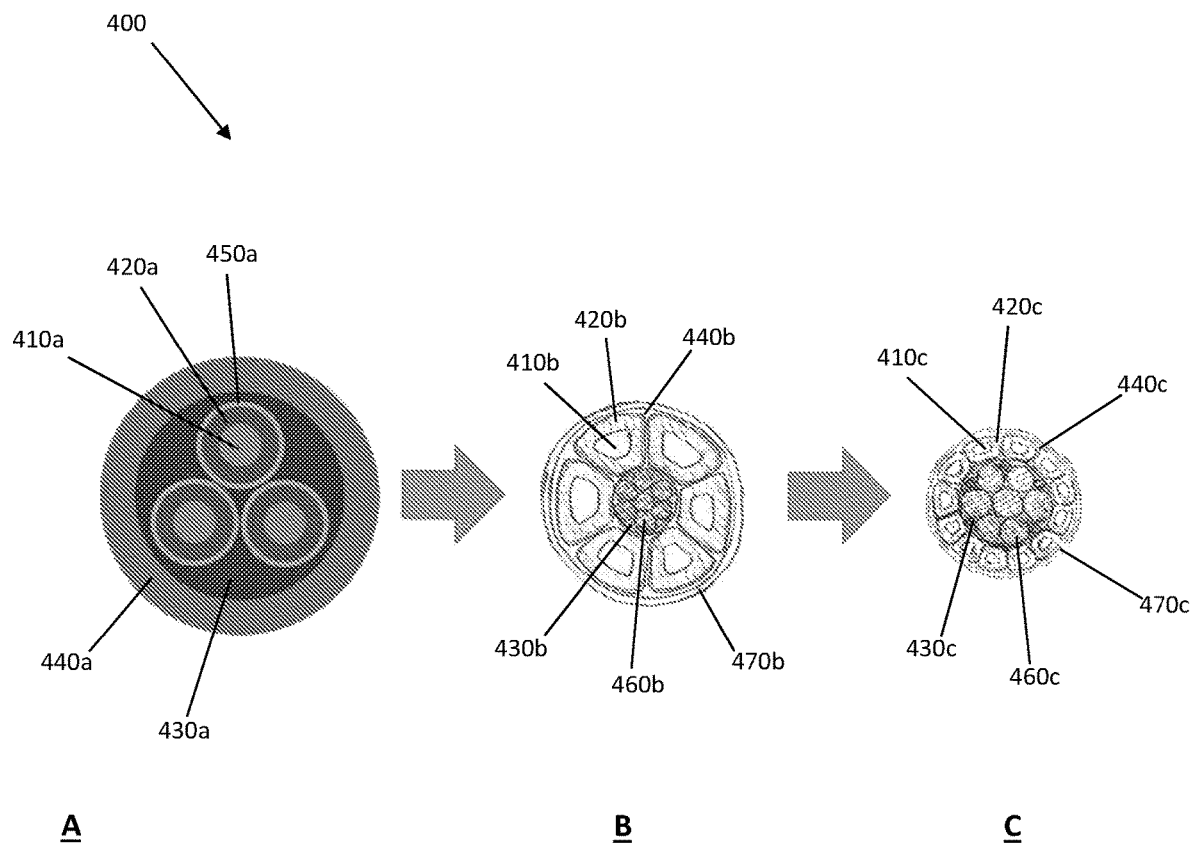
FIG. 4 is an illustration of a comparison of an example ESP cable (A) with shaped polyphase ESP cables (B, C) according to embodiments of the disclosure.

FIGS. 3 and 4 illustrate various embodiments of the disclosure based on round and shaped conductors. The shaped conductors again are constructed with a reduced radial dimension to enable a more space efficient arrangement of conductors. The space efficient arrangement allows the cross-sectional area of the ESP cable may be reduced and/or provides space for additional or other types of layers. As with the previous embodiment, the shaped conductors may be triangular, quadrilateral, polygonal, various arched shapes, e.g. arched in a circumferential direction, sector matching shapes, or other suitable shapes with a reduced radial dimension.

Embodiments of the disclosure may provide one or more of the following:
  (1) Flexibility—new center strength member may eliminate need for bulky encapsulation;
  (2) Low profile—geometrical advantage due to innovative construction;
  (3) Amperage capacity—split phases may reduce conductor sizes;
  (4) Ease of Termination—center strength member may ease anchoring and termination at upper and lower connectors;
  (5) Heat Dissipation—Arrangement of conductors and splitting of current may help heat dissipation characteristics (avoids center hot spot in cable, increasing efficiency). The voltage drop is equal vs. 3-phase cable due to current division in equiphase conductors, and the current and power dissipation are divided equally;
  (6) Use of round conductors—the polyphase system may allow for the use of round or shaped conductors while still attaining the low profile advantages.

Overall, the size reduction achieved for embodiments of the disclosure, as compared to a thick-walled tubing encapsulated ESP cable is significant. Since the strength member of embodiments of the disclosure is in the center of the cable, termination and load bearing characteristics are simplified greatly. In some embodiments of the disclosure various barriers layers may be included. Barrier layers may be polymeric or composite extrusions of fluid resistant materials (PEEK, PVDF, PFA, FEP, etc), or metallic sheaths of corrosion resistant alloys. These thin barriers layers, combined with separation of barrier and load bearing function, may eliminate the need for bulky, load bearing barriers. Furthermore, for torque balancing and additional strength, wire armor may be used in some embodiments around the outside of the cable. In some embodiments of the disclosure, physical protection of the core may be accomplished through helically wrapped armor.

In some embodiments of the disclosure, the braided wire would be combined with a polymeric jacket and subsequently wrapped with a metal strip armor to provide hoop strength and damage protection. In this case, fluid resistance can be improved by the use of additional barrier layers around the jacket or conductors. Barrier layers may be polymeric or composite extrusions of fluid resistant materials (PEEK, PVDF, PFA, FEP, etc), or metallic sheaths of corrosion resistant alloys.

Referring generally to FIG. 2, a standard round conductor cable A is compared against a 120 degree sector conductor cable B having a smaller overall cross-sectional area even though the total conductor cross-sections are equal (see cable 200). In the standard round conductor cable A, three conductors 210a are individually surrounded by insulation layer 220a. The coated conductors are contained within jacket layer 230a and subsequently protected by armor 240a. The 120 degree sector conductor cable B similarly has three conductors 210b that are each individually surrounded by an insulation layer 220b. A jacket layer 230b encapsulates the coated sector conductors. Armor layer 240b is disposed over jacket layer 230b.

Referring generally to FIG. 3, a standard round conductor cable A is compared against two polyphase round conductor cable embodiments B, C (see cable 300). In the standard round conductor cable A, three conductors 310a are individually surrounded by insulation layer 320a and barrier layer 350a. The coated conductors are contained within jacket layer 330a and subsequently protected by outer armor layer 340a. Polyphase conductor cable B includes six round conductors 310b that are each individually coated by an insulation layer 320b and barrier layer 350b. The six coated round conductors are bundled about a core having a strength member 360b or a plurality of strength members 360b. Each strength member 360b may comprise a cable, e.g. a steel cable, or other suitable strength member selected so the core of strength member(s) 360b is able to provide a desired cable strength/support. The core of strength members may include a binder material 330b to hold the strength member bundle together. The six-coated round conductors are secured in place about the strength members by jacket 340b. Armor layer 370b extends about jacket 340b. Polyphase conductor cable C includes nine round conductors 310c that are each individually coated by an insulation layer 320c and barrier layer 350c. The nine-coated round conductors are bundled about a core of strength members 360c. The core of strength members may include a binder material 330c to hold the strength member bundle together. The nine-coated round conductors are secured in place about the strength member bundle by jacket 340c. Armor layer 370c extends about jacket 340c.

Referring generally to FIG. 4, a standard round conductor cable A is compared against two polyphase sector conductor cable embodiments B, C (see cable 400). In the standard round conductor cable A, three conductors 410a are individually surrounded by insulation layer 420a and barrier layer 450a. The coated conductors are contained within jacket layer 430a and subsequently protected by outer armor layer 440a. Polyphase conductor cable B includes six sector conductors 410b that are each individually coated by an insulation layer 420b. The six coated sector conductors are bundled about a core having a strength member 460b or a plurality of strength members 460b. Each strength member 460b may comprise a cable, e.g. a steel cable, or other suitable strength member selected so the strength member core is able to provide a desired cable strength/support. The core of strength members 460b may include a binder material 430b to hold the strength member bundle together. The six-coated sector conductors are secured in place about the strength members by jacket 440b. Armor layer 470b covers jacket 440b. Polyphase conductor cable C includes nine sector conductors 410c that are each individually coated by an insulation layer 420c. The nine-coated sector conductors are bundled about a core of strength members 460c. The core of strength members may include a binder material 430c to hold the strength member bundle together. The nine-coated round conductors are secured in place about the strength member bundle by jacket 440c. Armor layer 470c extends about jacket 440c.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. An electric submersible pumping system power cable comprising:
   a strength member bundle forming a core of the cable, wherein the strength member anchors to the electric submersible pumping system to use the cable to deploy the electrical submersible pumping system into a downhole environment;
   individually insulated conductors disposed circumferentially about the strength member bundle, a number of the individually insulated conductors is at least 6 and a multiple of 3 such that each individual phase of polyphase power supplied to the electrical submersible pump is spilt and carried by at least 2 of the individually insulated conductors, and wherein each of the individually insulated conductors has a radial dimension and a circumferential dimension, wherein the radial dimension is shorter than the circumferential dimension; and
   a jacket layer disposed over the individually insulated conductors, wherein the jacket layer and/or insulation surrounding the individually insulated conductors comprises thermally conductive reinforcements,
   wherein heat dissipation characteristics of the thermally conductive reinforcements, the individually insulated conductors disposed circumferentially about the strength member bundle, and the carrying of current of each individual phase of the polyphase power by at least 2 of the individually insulated conductors increase power transmission efficiency by reduction in center hot spots.

2. The electric submersible pumping system cable of claim 1 additionally comprising an armor layer disposed over the jacket layer.

3. The electric submersible pumping system cable of claim 2 wherein the armor layer is a braided-wire armor.

4. The electric submersible pumping system cable of claim 1 wherein the strength member bundle comprises a plurality of steel cables.

5. The electric submersible pumping system cable of claim 1 wherein each conductor of the individually insulated conductors has a generally sector-shaped cross section.

6. The electric submersible pumping system cable of claim 1 wherein the number of the individually insulated conductors is at least nine.

7. A system comprising:
an electric submersible pumping system that comprises an electric motor, a motor protector, and a pump powered by the electric motor; and
an electric cable coupled to the electric motor to provide electrical power to the electric motor, the electric cable comprising:
a center strength member anchored to the electric submersible pumping system for deployment of the electrical submersible pumping system into a downhole environment;
a plurality of conductors each surrounded by insulation to provide a plurality of individually insulated conductors disposed about the strength member, each conductor having a radial dimension and a circumferential dimension, the radial dimension being shorter than the circumferential dimension, and the number of the plurality of individual conductors being at least 6 and a multiple of 3 such that each individual phase of polyphase power supplied to the electric motor is spilt and carried by at least 2 of the plurality of individually insulated conductors; and
a jacket layer disposed over the plurality of individually insulated conductors, wherein the insulation and/or the jacket layer comprises thermally conductive reinforcements,
wherein heat dissipation characteristics of the thermally conductive reinforcements, the plurality of individually insulated conductors disposed about the strength member, and the carrying of current of each individual phase of the polyphase power by at least 2 of the plurality of individually insulated conductors increase power transmission efficiency by reduction in center hot spots.

8. The system of claim 7 further comprising an armor layer disposed over the jacket layer.

9. The system of claim 7 wherein the strength member comprises a bundle of cables.

10. The system of claim 7 wherein each conductor has a polygonal cross-sectional shape.

11. The system of claim 7 wherein each conductor has a cross-sectional shape which is arched along the circumferential direction.

12. A method comprising:
providing an electric submersible pumping system that comprises an electric motor, a motor protector, and a pump powered by the electric motor; and an electric cable coupled to the electric motor to provide electrical power to the electric motor, the electric cable comprising: a center strength member; a plurality of conductors each surrounded by insulation to provide a plurality of individually insulated conductors disposed about the strength member, each conductor having a radial dimension and a circumferential dimension, the radial dimension being shorter than the circumferential dimension, and the number of the plurality of individual conductors being at least 6 and a multiple of 3; and
a jacket layer disposed over the plurality of individually insulated conductors, wherein the insulation and/or the jacket layer comprises thermally conductive reinforcements;
anchoring the center strength member to the electric submersible pumping system;
using the electric cable, deploying the electric submersible pumping system into a downhole environment; and
supplying polyphase power to the electric motor via the electric cable, wherein each individual phase of the polyphase power supplied to the electric motor is spilt and carried by at least 2 of the plurality of individually insulated conductors, and wherein heat dissipation characteristics of the electric cable dissipate heat to reduce forming center hot spots to thereby increase power transmission efficiency of the electric cable.

* * * * *